(12) United States Patent
Kazmi

(10) Patent No.: US 9,088,921 B2
(45) Date of Patent: Jul. 21, 2015

(54) DEVICE AND METHOD FOR TRANSMITTING CELL OFFSET IN TELECOMMUNICATION SYSTEM

(75) Inventor: Muhammad Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1045 days.

(21) Appl. No.: 12/666,169

(22) PCT Filed: Apr. 16, 2008

(86) PCT No.: PCT/SE2008/050429
§ 371 (c)(1),
(2), (4) Date: Dec. 22, 2009

(87) PCT Pub. No.: WO2009/002252
PCT Pub. Date: Dec. 31, 2008

(65) Prior Publication Data
US 2010/0330981 A1    Dec. 30, 2010

(30) Foreign Application Priority Data

Jun. 26, 2007 (SE) .................................... 0701566-2

(51) Int. Cl.
*H04W 4/00* (2009.01)
*H04W 36/00* (2009.01)
*H04B 17/00* (2015.01)

(52) U.S. Cl.
CPC ...... *H04W 36/0088* (2013.01); *H04W 36/0094* (2013.01)

(58) Field of Classification Search
CPC .................................................... H04W 16/24
USPC ....................................... 455/422.1, 67.7, 436
See application file for complete search history.

(56) References Cited

U.S. PATENT DOCUMENTS

| | | | |
|---|---|---|---|
| 6,031,826 A * | 2/2000 | Hassan | 455/522 |
| 6,647,005 B1 * | 11/2003 | Cao et al. | 370/342 |
| 7,127,253 B2 * | 10/2006 | Chen | 455/449 |
| 7,409,215 B2 * | 8/2008 | Kurose et al. | 455/436 |
| 2004/0198423 A1 * | 10/2004 | Park et al. | 455/552.1 |

(Continued)

FOREIGN PATENT DOCUMENTS

| | | |
|---|---|---|
| CN | 1878419 A | 12/2006 |
| EP | 1499147 A1 | 1/2005 |

(Continued)

OTHER PUBLICATIONS

Operator's view on neighbor cell information, 3GPP TSG RAN WG2 #58, Tdoc-R2-072010, Kobe, Japan, May 7-11, 2007.*

(Continued)

*Primary Examiner* — George Eng
*Assistant Examiner* — Muthuswamy Manoharan
(74) *Attorney, Agent, or Firm* — Coats & Bennett, P.L.L.C.

(57) ABSTRACT

A terminal unit, base station, computer readable medium and method for transmitting cell individual offset information from a base station in a cell in a communication network, to a user terminal that applies the cell individual offset information to measurement reports and/or events associated with the cell, including, generating the cell individual offset information; mapping the cell individual offset information on at least one channel that is different from a broadcast channel; and transmitting the mapped cell individual offset information.

21 Claims, 6 Drawing Sheets

(56) References Cited

U.S. PATENT DOCUMENTS

| | | | |
|---|---|---|---|
| 2005/0003831 A1* | 1/2005 | Anderson | 455/456.1 |
| 2006/0142021 A1* | 6/2006 | Mueckenheim et al. | 455/453 |
| 2007/0140106 A1 | 6/2007 | Tsai et al. | |
| 2007/0260851 A1* | 11/2007 | Taha et al. | 712/204 |
| 2008/0186918 A1* | 8/2008 | Tinnakornsrisuphap et al. | 370/331 |
| 2009/0268602 A1* | 10/2009 | Han et al. | 370/208 |
| 2009/0275337 A1 | 11/2009 | Maeda et al. | |

FOREIGN PATENT DOCUMENTS

| | | |
|---|---|---|
| EP | 1672812 A1 | 6/2006 |
| EP | 1909523 A1 | 4/2008 |
| EP | 2037696 A1 | 3/2009 |
| JP | 2005012566 A | 1/2005 |
| WO | 2005/081437 A1 | 9/2005 |
| WO | 2006103823 A1 | 10/2006 |
| WO | 2007/075463 A2 | 7/2007 |

OTHER PUBLICATIONS

NTT Docomo et al., "Use of cell specific offsets and reading neighbour BCH", 3GPP TSG RAN WG4 #43bis, Jun. 25-29, 2007, pp. 1-9, Orlando, US, Tdoc-R4-070914.

Ran WG2, "LS on neighbour cell lists and reading neighbour cell P-BCH", 3GPP TSG RAN WG2 #58, May 7-11, 2007, pp. 1-2, Kobe, Japan, Tdoc-R2-072188.

NTT Docomo et al., "Use of cell specific offsets and reading neighbour BCH," 3GPP TSG RAN WG2 #58bis, pp. 1-9, Jun. 25-29, 2007, Orlando, FL. Tdoc-R2-072721. 3GPP, Sophia-Antipolis, France.

* cited by examiner

DEVICE AND METHOD FOR TRANSMITTING CELL OFFSET IN TELECOMMUNICATION SYSTEM

TECHNICAL FIELD

The present invention generally relates to radio communication systems, devices, software and methods and, more particularly, to mechanisms and techniques for transmitting information related to a cell individual offset of a telecommunication network.

BACKGROUND

During the past years, the interest in radio access technologies for providing services for voice, video and data has increased. There are various telecom technologies used in cellular communications. The most widespread radio access technology for mobile communication is digital cellular. Increased interest is shown in 3G (third generation) systems. 3G systems and, then, even higher bandwidth radio communications introduced by Universal Terrestrial Radio Access (UTRA) standards made applications like surfing the web more easily accessible to millions of users.

Even as new network designs are rolled out by network manufacturers, future systems which provide greater data throughputs to end user devices are under discussion and development. For example, the so-called 3GPP Long Term Evolution (LTE) standardization project is intended to provide a technical basis for radio communications in the decades to come.

To ensure competitiveness of Universal Mobile Telecommunications Service (UMTS) networks for the future, new concepts for UMTS Long Term Evolution (LTE) have been investigated. The objectives are a high-data-rate, low-latency and packet optimized radio access technology. Therefore, E-UTRA (Evolved UMTS Terrestrial Radio Access) and E-UTRAN (Evolved UMTS Terrestrial Radio Access Network) have been launched to address these objectives.

In E-UTRAN, Orthogonal Frequency Division Multiple Access (OFDMA) technology is used in the downlink. OFDM is a modulation scheme in which the data to be transmitted is split into several sub-streams, where each sub-stream is modulated on a separate sub-carrier. Hence, in OFDMA based systems, the available bandwidth is sub-divided into several resource blocks or units prior to being transmitted. A resource block may be defined in both time and frequency. According to the current assumptions in UTRAN, a resource block size is 180 KHz and 0.5 ms in frequency and time domains, respectively. The overall uplink and downlink transmission bandwidth can be as large as 20 MHz.

An overall architecture for an E-UTRAN system is shown in FIG. 1. The E-UTRAN includes one or more E-UTRAN NodeBs (eNBs) 10, providing the E-UTRAN user plane and control plane protocol terminations towards the user terminal 12. The eNBs 10 are interconnected with each other by the X2 interface 14. The eNBs 10 are also connected by the S1 interface 16 to the MME (Mobility Management Entity) 18 by the S1-MME and to the Serving Gateway (S-GW) 18 by the S1-U.

In the following, various technological aspects and features related to E-UTRAN as well as UTRAN systems are described. Regarding downlink neighboring cell measurements, in E-UTRAN, the user terminal performs a number of neighbor cell measurements. These measurements may be used for handovers, cell reselection in idle mode, etc. Examples of such measurements are Reference Symbol Received Power (RSRP) and E-UTRAN carrier Received Signal Strength Indication (RSSI). These measurements (e.g., RSRP) are generally performed on known reference signals. Carrier RSSI is however measured over all the symbols sent over the entire carrier frequency. In UTRAN, similar measurements are used for idle and for connected mode mobility. Examples of UTRAN measurements are (Common Pilot Channel) CPICH RSCP, CPICH Ec/NO and UTRA carrier RSSI, as disclosed for example in 3GPP TS 25.215, "Physical layer measurements (FDD)," the entire content of which is enclosed herewith by reference.

However, a conventional telecommunication network can support more than one carrier frequency. In that case, the user terminal is required to perform the above discussed measurements on both frequencies: intra-frequency and inter-frequency measurements. Intra-frequency neighboring cell measurements and inter-frequency neighboring cell measurements may be defined as follows. Neighboring cell measurements performed by the user terminal are intra-frequency measurements when the current and target cells operate on the same carrier frequency. Neighboring cell measurements performed by the user terminal are inter-frequency measurements when the neighboring cell operates on a different carrier frequency, compared to the current cell.

The structure of the measurement reporting to be performed by the user terminal is discussed next. The serving cell (the cell that currently serves the user terminal) generally configures the user terminal to perform neighboring cell measurements for mobility and to report the measurement reports to a base station of the serving cell. The term "base station" is used in the following as a generic term. As it is known, in the Wideband Code Division Multiple Access (WCDMA) architecture, a NodeB may correspond to the base station. In other words, a base station is a possible implementation of the NodeB. However, the NodeB is broader than the conventional base station. The NodeB refers in general to a logical node. A NodeB in WCDMA is handling transmission and reception in one or several cells. For the LTE architecture, there is a single node, the eNodeB. Although conventionally the term "base station" is narrower than the NodeB of the WCDMA architecture or the eNodeB of the LTE architecture, the term "base station" is used in the following exemplary embodiments as defining the NodeB, eNodeB or other nodes specific for other architectures. Thus, the term "base station" defined and used in the present disclosure is not limited to the conventional base station unit of a network.

There are two approaches, as disclosed in 3GPP TS 25.331, "RRC protocol specification," the entire content of this document being incorporated by reference here, for performing the measurements. A first approach is based on a blind identification and measurement on cells performed by the user terminal and a second approach is based on received list of neighboring cells. In the first approach, the serving cell instructs the user terminal to identify and measure, and if necessary, to also report P best neighboring cells, i.e., cells from which a signal having certain parameters is detected by the user terminal. No list of the neighboring cells is provided by the serving cell to the user terminal according to this approach. The user terminal identifies and measures the best neighboring cells and reports the events and/or measurements to the serving cell.

In the second approach, the serving cell provides an explicit list of neighboring cells (R) to the user terminal and the user terminal is instructed to measure only those R cells. The list may include instructions to report only the best P neighboring cells out of the existing R cells. The cell list provided by the serving cell may include only the identity of the neighboring cells.

In WCDMA systems, both these approaches are used. However, the second approach is more suitable to WCDMA systems due to better performance requirements. In E-UTRAN systems, the first approach (i.e., without neighboring cell list) is considered to better fit the requirements of this system. However, the user terminal should apply a cell individual offset to each cell for which a measurement is performed or an event is determined as will be discussed later. The cell individual offset is specific to each cell and it is the value of this offset that the user terminal needs to apply when reporting to the serving cell an event or when taking mobility related decisions such as cell reselection, handover etc. Next, it is discussed the reporting of events and measurements by the user terminal.

In RRC_CONNECTED (Radio Resource Control) mode, the user terminal reports the measurements collected from the neighboring cell to the serving cell (i) periodically, (ii) event triggered, and/or (iii) event triggered in a periodical fashion. According to the last mechanism, after the occurrence of an event occurs (e.g., neighbor cell quality becomes x dB greater than that of the serving cell), the user terminal starts periodical reporting of the measurement(s). In addition, in the RRC_CONNECTED mode the user terminal also reports a number of events based on the performed measurements. For instance, an event is generated in the user terminal when a particular measurement quantity in a neighboring cell exceeds or falls below a threshold level. Another example of an event is when a certain measured quantity in a neighboring cell exceeds or falls below the same quantity in another neighboring cell or the serving cell. One skilled in the art would appreciate other events in UTRAN or E-UTRAN.

To perform the required measurements or determine the specific events, the user terminal, according to a first approach, needs to read the system information of each neighboring cell to be measured via the broadcast channel (BCH) to acquire the neighboring cell individual offset. Thus, the user terminal has to read the system information of all the neighboring cells for which measurement reports or associated events are to be sent to the serving cell. The drawback of this approach is the delay in reading the system information since the system information is sent with some periodicity (e.g., 40 or 80 ms or even longer) due to the structure of the broadcast channel. Another drawback is that the user terminal's processing time will increase. Furthermore, the user terminal is required to read system information even if the offset of the neighboring cell is 0 dB (i.e., there is no offset).

According to a second approach, the serving cell instructs the user terminal whether it should apply neighboring cell offsets or not when reporting the measurements and/or events. This instruction is the same for all neighboring cells. However, a drawback of this approach is in the case that the serving cell instructs the user terminal not to apply the offset. Then, the user terminal will not apply the offset even if there are cells requiring the offset. This approach may lead to inappropriate event triggering in cells with offsets and also may lead to capacity loss, as suggested in 3GPP R4-070914, "Use of cell specific offsets and reading neighbor BCH," the entire content of which is incorporated here by reference.

A third approach is to not require the user terminal to read the system information to receive the cell offsets. Thus, in this instance, the user terminal reports measurements and events to the serving cell without any offsets. In order to achieve 0 dB offset (i.e., no offset) all cells should have the same coverage (e.g., a common channel power setting) and there should be no loss due to uplink and downlink imbalance. However, this objective is difficult to be achieved because all cells in all the coverage scenarios would not have the same coverage and/or uplink and downlink imbalances. Thus, in a practical case, where there will be non-zero offsets at least in some cells within the coverage area, the user terminal may trigger undesired events (early or delayed depending whether the offset is negative or positive), which lead to the loss in capacity.

SUMMARY

According to one exemplary embodiment, there is a method for transmitting cell individual offset information, associated with an offset of a cell, to a user terminal, which is configured to communicate with the cell in addition to a serving cell. The method included generating the cell individual offset information; mapping the cell individual offset information on at least one channel that is different from a broadcast channel; and transmitting the mapped cell individual offset information.

According to another exemplary embodiment, there is a method for determining whether to apply cell individual offset information at a user terminal, which is configured to be connected to a cell in a communication network in addition to a serving cell, to measurement reports and/or events associated with the cell. The method includes receiving at least one channel, different from a broadcast channel, in which the cell individual offset information has been mapped; extracting the cell individual offset information from the at least one channel; and determining from the cell individual offset information whether the offset is present in the cell.

According to another exemplary embodiment, there is a base station in a cell configured to send cell individual offset information to a user terminal, the base station and the user terminal are connected to a communication network, and the user terminal applies the cell individual offset information to measurement reports and/or events associated with the cell. The base station includes a processor configured to generate the cell individual offset information; the processor being configured to map the cell individual offset information on at least one channel that is different from a broadcast channel; and an antenna connected to the processor and configured to transmit the mapped cell individual offset information received from the processor.

According to another exemplary embodiment, there is a user terminal connected in a communication network to a base station in a cell, the user terminal being configured to determine whether to apply cell individual offset information to measurement reports and/or events associated with the cell. The user terminal includes an antenna configured to receive at least one channel in which the cell individual offset information has been mapped, the at least one channel being different from a broadcast channel; a processor connected to the antenna and configured to extract the cell individual offset information from the received at least one channel; and the processor being further configured to determine from the cell individual offset information whether the offset is present in the cell.

According to still another exemplary embodiment, there is a computer readable medium that stores instructions, which when executed on a processor in a base station in a cell in a communication network, send cell individual offset information to a user terminal that applies the cell individual offset information to measurement reports and/or events associated with the cell. The instructions include generating the cell individual offset information; mapping the cell individual offset information on at least one channel that is different from a broadcast channel; and transmitting the mapped cell individual offset information.

According to another exemplary embodiment, there is a computer readable medium that stores instructions, which when executed on a processor in a user terminal, which is connected to a cell in a communication network, determine whether to apply cell individual offset information to measurement reports and/or events associated with the cell. The instructions include receiving at least one channel, different from a broadcast channel, in which the cell individual offset information has been mapped; extracting the cell individual offset information from the at least one channel; and determining from the cell individual offset information whether the offset is present in the cell.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of UTRAN and E-UTRAN systems described above. However, the embodiments to be discussed next are not limited to these systems but may be applied to other existing telecommunications systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
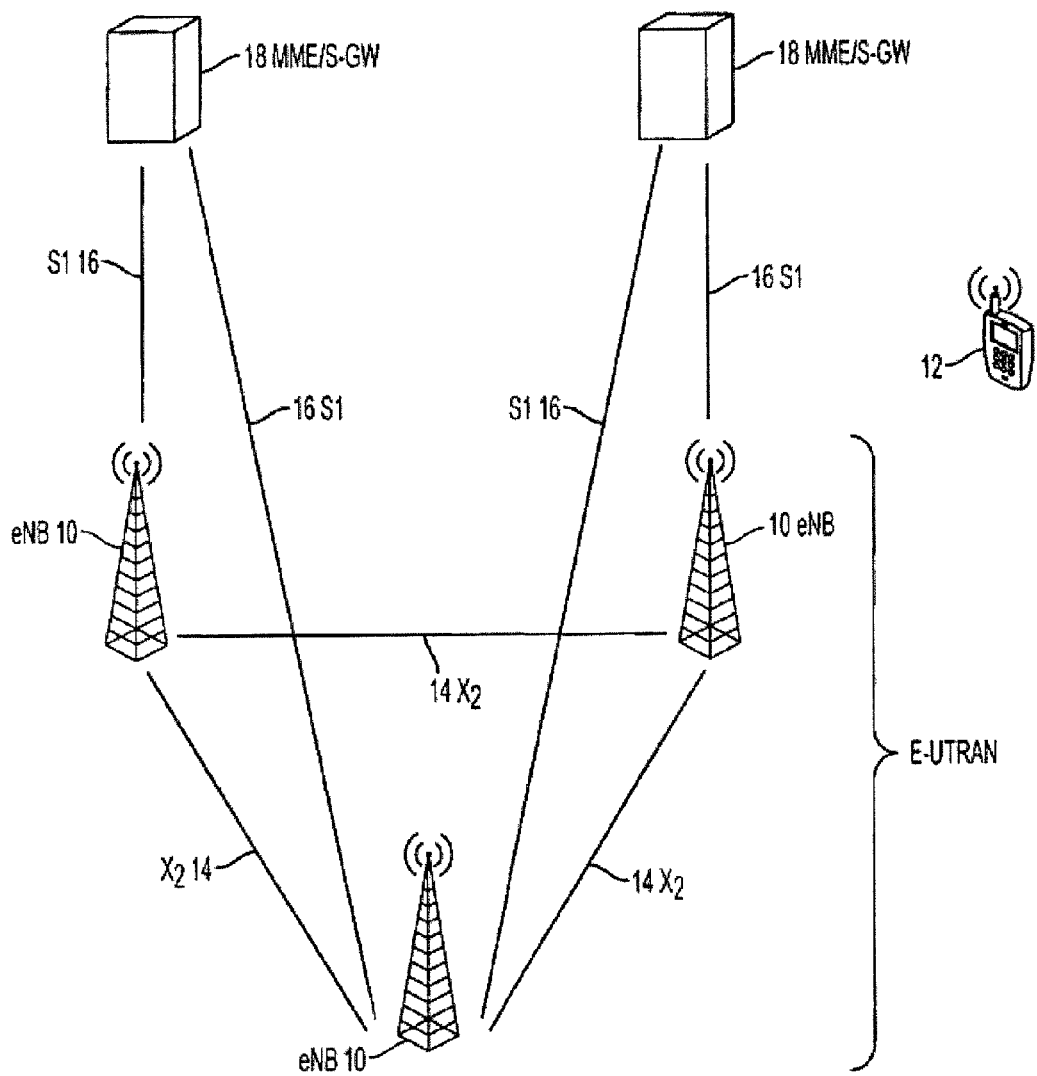
FIG. 1 is a schematic diagram of a E-UTRAN communication system including a base station and a user terminal.
Figure 2:
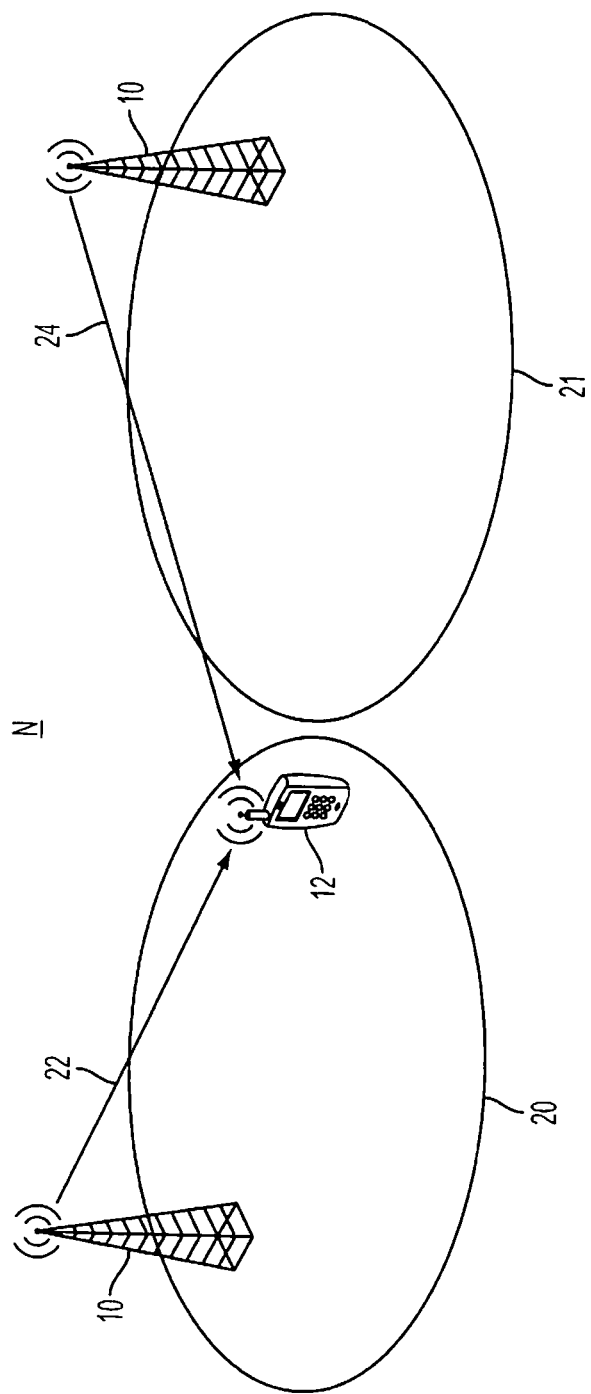
FIG. 2 is a schematic diagram of a communication system having at least two cells.

As shown in FIG. 2, according to an exemplary embodiment, a general telecommunication network N includes at least two cells 20 and 21 and at least one user terminal 12. The user terminal 12, when physically present in cell 20, receives a signal 22 from the base station 10 of cell 20. However, the user terminal 12 may also receive a signal 24 from the base station 10 of cell 21. In other words, cell 20 is the serving cell at that instant and cell 21 is a potential future serving cell. In one exemplary embodiment, each cell has a specific cell individual offset. However, it is possible that two or more cells have a common cell offset. The cell individual offset value may incorporate, according to an exemplary embodiment, a number of deployment and impairment aspects of a particular cell. More specifically, the cell individual offset represents the uplink and downlink imbalances caused due to cable losses associated with tower mounted amplifiers (TMA). Another factor that may contribute to a specific cell individual offset is the different settings of common channel powers in different cells.

For instance, in one exemplary scenario, transmit power levels of the reference symbols in E-UTRAN (or CPICH power in UTRAN) in neighboring cells may not be the same. The difference can be due to various deployment reasons such as giving more power to data symbols. The reference symbol power directly affects the cell coverage. This is because the neighboring cell measurements (e.g., RSRP) are based on reference symbols. Thus a mismatch in the transmit reference symbol power in different neighboring cells may lead to inappropriate generation of events. If the network is aware of this mismatch, the network may be configured, as will be discussed next, to use the cell individual offset and thus, solve the above noted problem present in the traditional networks. Thus, at least for these reasons, the operators of the cells would like this offset to be used by the user terminal when reporting events and measurements to the base station.

The cell individual offset are not calculated/determined to assist the network to improve a sync process between a user terminal and a cell. For the synch process, a frequency offset is used but the frequency offset is different from the cell individual offsets discussed in this application. The cell individual offsets are applied to measurements and events, which are performed after cells are properly in sync and identified.

Figure 3:
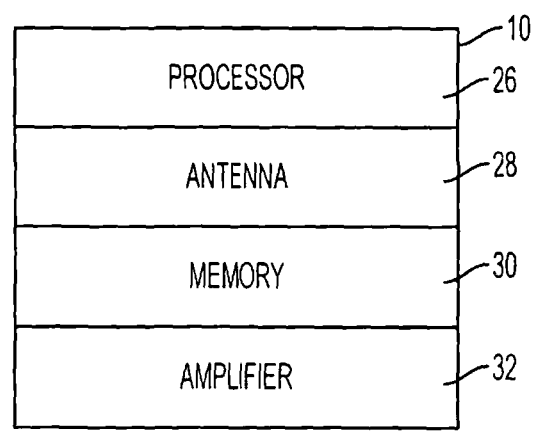
FIG. 3 is a schematic diagram of a base station or a user terminal.

A structure of the base station 10 is shown in FIG. 3. In this regard, it is noted that the structure shown in FIG. 3 may be the structure of the user terminal. The base station may include a processor 26 that performs the processing of the incoming and outgoing signals. The signals are transmitted via an antenna 28 that is connected to the processor 26. The processor 26 may include a specialized processing unit (not shown) for mapping, coding, decoding, extracting, etc. of various symbols as would be recognized by one skilled in the art. The base station may optionally have a memory 30 for storing data. The processor 26 may be configured to read and store data to the memory data. In addition, the base station may include an amplifier 32 (the TMA for example) and corresponding cables for amplifying transmitted signals. The above components of the base station may be implemented as electrical circuitry, computer instructions or a combination thereof.

The cell individual offset can be negative or positive. In WCDMA systems, the cell individual offset can have any value between −10 to +10 dB. The actual value in a cell depends upon the common power setting, uplink/downlink imbalance, antenna configuration, etc. in that particular cell. The cell individual offset can be the same or it can be different for intra-frequency and inter-frequency measurements. According to an exemplary embodiment, the largest contributor to the offset may be the loss due to the cables of the TMA 32. Therefore, in a particular base station site, all the cells using the same TMA and cable may have the same uplink and downlink imbalance. Thus, the same offset value may be used for intra and inter frequency measurements for the base stations in this particular example. However, the actual implementation depends upon the particular network deployment and operators' choice.

The measurements to be taken by the user terminal are conventionally performed in various ways, as discussed next. In a WCDMA system, the measurement method is based on the neighboring cell list, i.e., the serving cell sends the complete list of the associated cell individual offset values to the user terminal. The cell offset values are sent to the user terminal in idle as well as in RRC connected modes. Thus, the user terminal can apply an appropriate offset when reporting events associated with one or more neighboring cells. This approach does not require the user terminal to read the system information of any of the neighboring cells to determine the offset value of those cells. In E-UTRAN systems, one approach is to request the user terminal to measure and report the results from P best cells. This approach reduces the downlink signaling overheads, as transmitting the neighboring cell list consumes considerable resources. However, the neighboring cell list based measurement approach is optional in E-UTRAN. Thus, in the conventional E-UTRAN approach, the serving cell cannot indicate the cell individual offsets of the neighboring cells since there is no neighboring cell list. To correct this problem, the conventional E-UTRAN systems mandate the user terminal to read the system information of the neighboring cells to determine the cell offset value. Under these circumstances, the user terminal applies the determined offsets to the measurements or the events before transmitting them to the serving cell. However, a problem of the conventional systems is that the user terminal needs to read the system information on the broadcast channel to determine the offset, which will cause delays, will increase the user terminal power consumption, and which will require the user terminal to process more information. The resulting delays arise due to the fact that the system information is sent via the broadcast channel, which is sent with a certain periodicity, as previously discussed.

According to the following exemplary embodiments, the above problems of the conventional telecommunication systems may be avoided by transmitting the cell individual offset information on channels other than the broadcast channels, e.g., channels including reference or pilot symbols, as will be discussed next.

A brief overview of the reference symbol channels and other channels used by the telecommunications systems, according to exemplary embodiments, to transmit system information is presented here, before presenting the solution to the above noted problems in the conventional systems. A reference symbols channel is considered in UTRAN or E-UTRAN a channel or pattern that contains a well defined sequence of pilot or reference symbols. In WCDMA for example, such channels are: Primary Synchronization Channel (P-SCH), Secondary Synchronization Channel (S-SCH) and Common Pilot Channel (CPICH) channels, as discussed in TS 25.211, "Physical channels and mapping of transport channels onto physical channels (FDD)," the entire content of which is incorporated here by reference. In E-UTRAN systems, such channels are: P-SCH, S-SCH and Reference Signals (RS), as discussed in TS 36.211, "Evolved Universal Terrestrial Radio Access (E-UTRA); Physical channels and mapping of transport channels onto physical channels (FDD)," the entire content of which is incorporated here by reference. All the documents mentioned in this disclosure and pertaining to LTE systems are available on the web site of 3GPP, 650 Route des Luciloes, Sophia Antipolis Valbonne, France.

The P-SCH and S-SCH channels may be used by the user terminal for achieving the synchronization of symbol timing, frequency, frame boundary etc. The other channels such as CPICH (in WCDMA) and Reference Signals (RS) may be used for cell identification and for performing neighboring cell measurements.

In E-UTRAN systems, the broadcast channel may be transmitted in the center of the cell transmission bandwidth. The bandwidth of the broadcast channel, according to one exemplary embodiment, is 1.25 MHz. The broadcast channel may not be continuously transmitted. In this exemplary embodiment, there is a primary broadcast channel (P-BCH) and also a dedicated broadcast channel (D-BCH). The primary broadcast channel may contain information necessary to the transmission of data, and this channel is therefore sent periodically, for example every 40 or 80 ms according to an exemplary embodiment. Other time periods are also possible. The dedicated broadcast channel is not sent in a periodic manner and its resource allocation information may be sent on the primary broadcast channel.

In WCDMA systems, the broadcast channel is sent in every frame according to an exemplary embodiment. The cell individual offset to be used by the user terminal in idle mode is therefore sent on the broadcast channel. The user terminal in the RRC_CONNECTED mode receives the offset values via a dedicated control channel (DCCH) from its serving cell.

To avoid the delays and other disadvantages (discussed above) associated with transmitting the cell individual offset information on the broadcast channel, according to an exemplary embodiment, the cell individual offset related information is signaled by each neighboring cell to the user terminal via the reference or pilot symbols, i.e., coding this information on synchronization and/or reference symbols used for demodulation of neighboring cell measurements. In another exemplary embodiment, the cell individual offset information is transmitted on channels different from the broadcast channel or the reference symbols channel. The cell individual offset information, which is sent on the reference symbols, may either be in the form of a single bit indicating the presence or absence of the cell offset, or may be more detailed information containing the actual offset value of the cell. According to another exemplary embodiment, the user terminal is not required to read the system information of the neighboring cell to acquire the cell individual offset when the actual offset value of the cell is transmitted to the user terminal.

Figure 4:
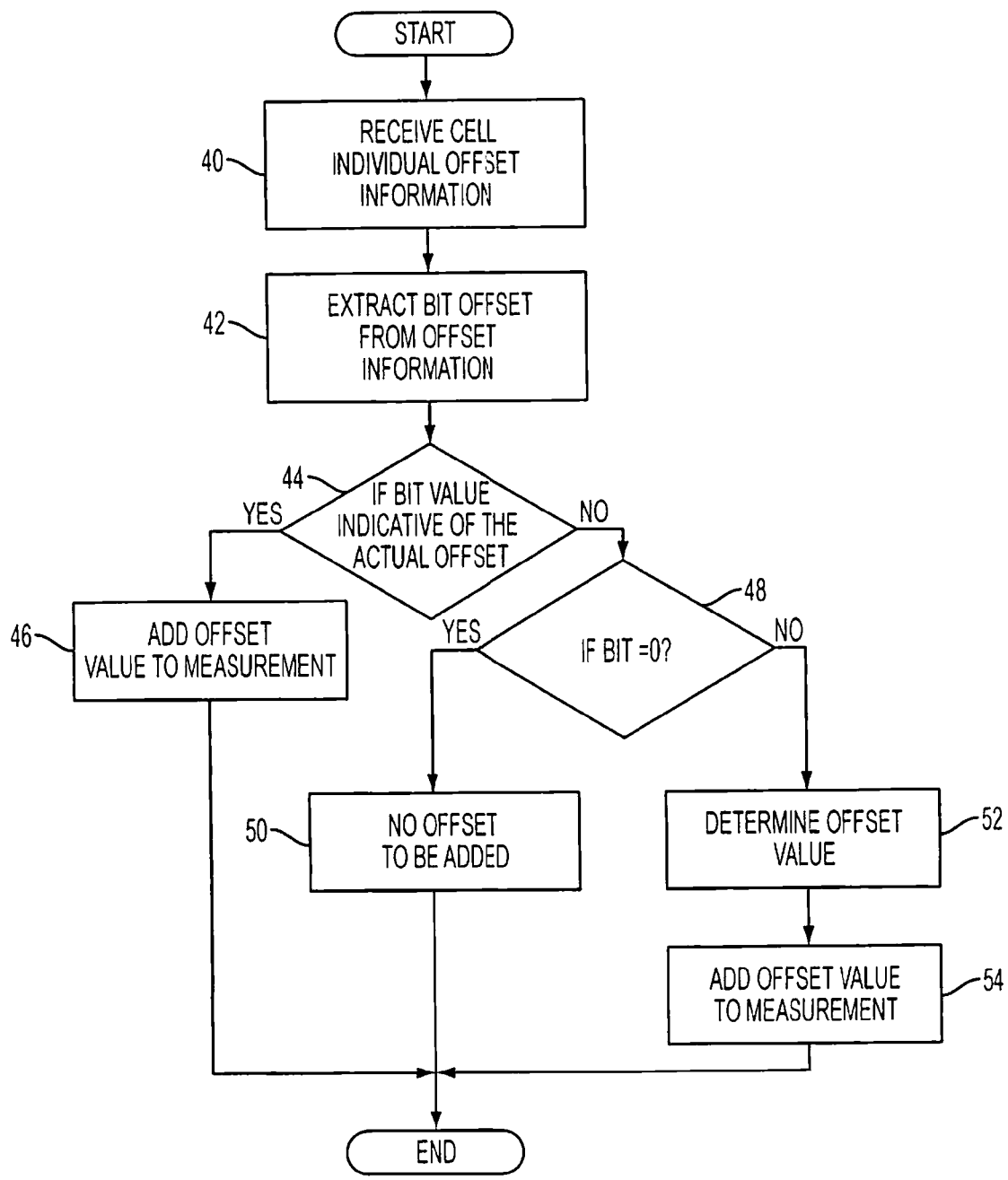
FIG. 4 is a flow chart illustrating the determination of an offset of a cell from transmitted cell individual offset information.

In one exemplary embodiment, the user terminal receives only a bit indicative of the presence or absence of the offset at the cell. FIG. 4 shows in step 40 that the cell individual offset information is received. In step 42, the user terminal extracts from the cell individual offset information the bit offset. The bit offset may be indicative of the presence or absence of the offset of the cell or may include the actual value of the offset. In step 44, this determination is performed. If the bit offset includes the actual value of the offset, then in step 46 the offset value is added to the measurement and the process for determining the cell offset ends. However, if in step 44 is determined that bit offset does not include the actual value of the offset, the process advances to step 48 in which it is determined what bit is received. For example, the user terminal may receive a bit "0" when there is no offset at the neighboring cell and a bit "1" when there is an offset in the cell. If the extracted bit is determined to be "0" in step 48, the user terminal concludes that no offset is needed at the neighboring cell and decides in step 50 to add no offset when reporting the measured data to the serving cell. However, if the bit is determined in step 48 to be "1," the user terminal determines in step 52 the offset of the neighboring cell. The user terminal may determine the offset value by analyzing the system information transmitted on the broadcast channel by the neighboring cell. Once the offset value is determined, the user terminal adds that offset value in step 54 to the measurement report and sends the report to the serving cell. Thus, in this exemplary embodiment, the user terminal does not have to search the broadcast channel of those neighboring cell that have a zero offset. Encoding the cell individual offset information is discussed next.

In E-UTRAN systems, the cell individual offset of each cell may be coded on one or more channels containing reference or pilot symbols signals of the same cell. For example, one of the Primary Synchronization Channel (P-SCH), Secondary Synchronization Channel (S-SCH), or the Reference symbols can be used to encode the cell individual offset. The P-SSCH/S-SCH channels may be used in one embodiment by the user terminal to acquire synchronization data such as, for example, frequency, symbol timing, sub-frame timing, frame timing etc., and also, for example, to identify the neighboring cell (i.e., neighboring cell physical layer identity). Similarly, the reference signals may be used by the user terminal to perform neighboring cell measurements (e.g., RSRP) of the cells identified during synchronization procedure.

These channels or reference signals are read by the user terminal for cell identification and neighboring cell measurements. Therefore, if the cell individual offset information of the neighboring cell is coded or embedded in one or more of these reference symbol channels, the user terminal may acquire the corresponding offset without reading the system information of the neighboring cell, in contrast to the conventional telecommunication systems. As discussed above, the cell individual offset should not be confused with other offsets used in a telecommunication system, such as frequency or time offsets, which serve different purposes. It is known that the system information in the conventional telecommunication systems is mapped on the broadcast channel. Thus, coding the cell individual offset information in one exemplary embodiment on channel(s) containing reference signals reduces the delay in acquiring the cell offset. In another exemplary embodiment, the user terminal may be configured to not read the system information, which further reduces the processing time and computational effort of the user terminal. Thus, the user terminal of this embodiment may save battery power consumption.

There are different possible mechanisms to signal or code the cell individual offsets information on channels including the reference signals. The signaling may be based on an implicit indication of the cell offset in one exemplary embodiment or may be based on an explicit indication of the cell offset. These two embodiments are discussed next.

In the implicit cell offset indication embodiment, the user terminal is informed via reference symbols (P-SCH or S-SCH or reference signal or combination thereof) whether the cell individual offset is zero or non zero. This information may be coded in the form of one or more bit of information, e.g., "0" indicates that the cell offset is zero (i.e., 0 dB) and "1" indicates that the cell offset is non zero or vice versa. The values "0" and "1" are exemplary and not intended to limit the exemplary embodiments. In one exemplary embodiment, when the coded bit indicates the zero offset (no offset), the user terminal does not need to read the system information of the cell having the zero offset. If the coded bit(s) indicates a non-zero offset (i.e., there is an offset), only then the user terminal reads the system information of the cell having the non-zero offset to acquire the actual offset value. One advantage of this method is that the user terminal does not have to read the broadcast channel of all the cells when the coded bit indicates a zero offset. In the traditional techniques, the user terminal reads the broadcast channel of all the cells, regardless of whether cell individual offset exists or not in a particular cell. Typically, only a sub-set of cells have the cell individual offset non-zero. Thus, the traditional method requires the user terminal to perform more searching than necessary, which results in a delay in reporting events and measurement reports. This in turn deteriorates the mobility (cell reselection and handover) performance of the network.

More specifically, a real system generally has some of the cells with zero offsets and the remaining cells with non-zero offsets. Thus, for real systems, according to this exemplary embodiment, the user terminal reads the system information of the cells less frequently compared to the case when the user terminal has to read the system information of all the cells (including the cells with zero offsets) to acquire the offsets because the user terminal of this exemplary embodiment does not need to read the system information for those cells for which the offset values are zero. To the contrary, the conventional telecommunication systems read the system information of all the cells irrespective whether the offset value is zero or non-zero. The same information may also be used by the serving cell to indicate whether the user terminal should apply or not the cell offset in a particular cell, even when there is an offset (non-zero value) for a cell. This approach involves low overheads and it is a fast way of knowing whether a particular cell has an offset or not.

In the explicit cell offset indication exemplary embodiment, the user terminal acquires the actual cell offset used in the cell via the reference signals. This approach does not require the user terminal to read the neighboring cell system information for the purpose of acquiring the cell individual offset.

Next, the signaling of the information associated with the offset information of the cells is discussed. For values of the cell individual offset between −10 dB to +10 dB, up to 5 or 6 bits may have to be signaled on reference symbols (P-SCH, S-SCH or reference signals channel) to the user terminal. The signaling may be performed in a number of ways. Two exemplary methods are discussed next.

According to an exemplary embodiment, an offset indication per occurrence of reference symbol channels method is discussed. The complete offset value or the one or more bits associated with the offset value is coded on one or more of the channels containing reference symbols. In other words, all bits (N) representative of the offset value or the single bit indicating the presence or absence of the cell offset are sent on the same channel: P-SCH or S-SCH or reference signals channel. In another exemplary embodiment, some bits are sent on one channel whereas the remaining bits are sent on another channel(s). One advantage of this method is that the user terminal acquires the cell individual offset information quickly since the entire information is mapped on one or more channels. The acquisition time may depend upon the radio conditions. For example, for good conditions, e.g., when received SINR of the P-SCH/S-SCH is above −3 dB, the delay may be just one occurrence of these channels (e.g., 5 or 10 ms in case of P-SCH/S-SCH). However, according to this embodiment, more overhead transmission per channel occurrence is involved.

According to another exemplary embodiment, an offset indication via successive occurrences of reference symbol channels method is discussed. In this method, all the bits (N) containing the offset value or the bit indicative of the presence or absence of the cell offset are periodically sent via K (K=N/M) successive or every Lth reference signal channel(s). For L=1, the information is sent in every successive reference signal channels. The value M (M<N) is the number of bits sent per reference channels. As an example not intended to limit the exemplary embodiments, for N=4 (i.e., 16 offset values) and M=1, the cell offset value is sent over 4 successive reference channels in time. In other words, one bit is sent during the transmission of each reference symbol channel. However, more than one bit (e.g., 2 bits) may also be sent per reference channel transmission. In that case, the offset cell value will be sent over K=2 successive transmissions of the corresponding reference channel(s).

According to the exemplary embodiment discussed above, for the cell offset value (e.g., N=4 and M=1) sent over P-SCH or/and S-SCH, a minimum time necessary for the user terminal to acquire the cell offset information is the time of K=4 successive SCH channel transmissions. In LTE systems, this time corresponds to 20 ms since P-SCH/S-SCH appears once every 5 ms. Thus, based on this exemplary embodiment, a reduction in overheads is achieved since one bit is sent per reference channels. A disadvantage of this method is the slightly longer delay (i.e., N/M times) compared to the previous method. However, the delay in this embodiment is minimal because the user terminal does not need to read the system information to acquire the offset individual cell, and because the user terminal demodulates the reference channels several times for synchronization or for neighboring cell measurements.

In this exemplary embodiment, the N bit of information (or the offset value) is repeated after every K×L occurrences of the reference signal channel. Thus, the user terminal needs to be aware when the pattern of N-bits starts. According to one exemplary embodiment, the user terminal may be configured to start the pattern at the boundary of the slot, sub-frame or frame or any other well defined time-offset or signal boundary known to the user terminal. Because the user terminal acquires, during the synchronization procedure, the frame, sub-frame and slot boundaries, the user terminal is able to correctly interpret the meaning of the N bits representing the cell offset information after synchronizing the N bits with any of these boundaries.

The exemplary embodiments discussed in this application are applicable not only to UTRAN or E-UTRAN systems but to any telecommunication system in which the user terminal needs to use the cell individual offset information and where the cell (e.g., the serving cell) does not signal the neighboring cell list to the user terminal.

Figure 5:
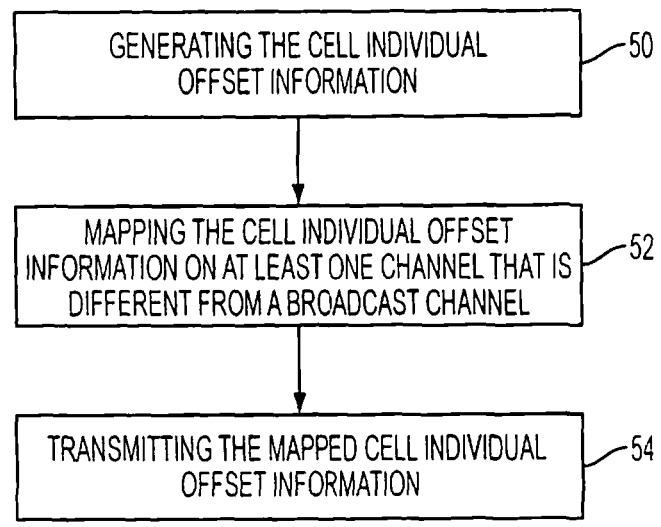
FIG. 5 is a flow chart illustrating the mapping of the cell individual offset information in a base station.

FIG. 5 shows the steps to be followed when implementing a method for transmitting cell individual offset information, associated with an offset of a cell, to a user terminal, which is configured to communicate with the cell in addition to a serving cell. The method includes, in step 50, generating the cell individual offset information, in step 52 mapping the cell individual offset information on at least one channel that is different from a broadcast channel, and in step 54 transmitting the mapped cell individual offset information.

Figure 6:
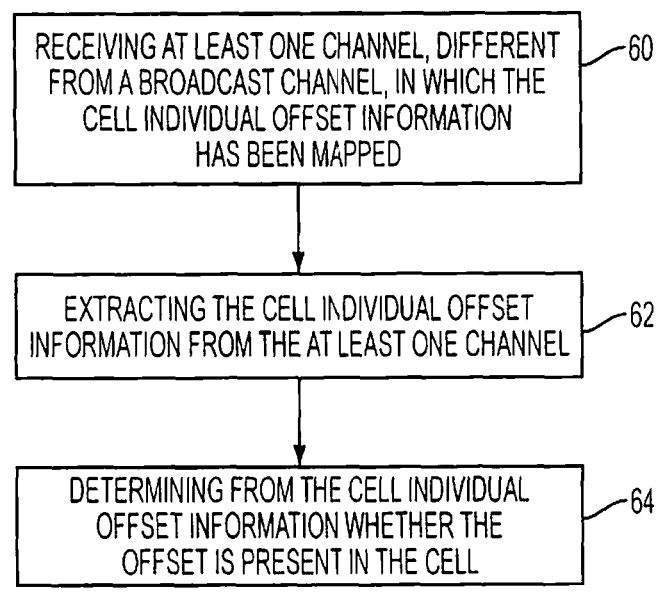
FIG. 6 is a flow chart illustrating the extraction of the cell individual offset information in the user terminal.

FIG. 6 shows a method for determining whether to apply cell individual offset information at a user terminal, which is configured to be connected to a cell in a communication network in addition to a serving cell, to measurement reports and/or events associated with the cell. The method includes, in step 60, receiving at least one channel, different from a broadcast channel, in which the cell individual offset information has been mapped, in step 62 extracting the cell individual offset information from the at least one channel, and in step 64 determining from the cell individual offset information whether the offset is present in the cell.

In one exemplary embodiment, the cell individual offset information mapped on reference signals may be the same for intra-frequency and inter-frequency measurements and events. In a different exemplary embodiment, there are different offsets for intra and inter frequency measurements.

The disclosed exemplary embodiments provide a user terminal, a system, a method and a computer program product for sending cell individual offset information from a base station in a cell in a communication network, to a user terminal that applies the cell individual offset information to measurement reports and/or events associated with the cell. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

The present exemplary embodiments may be implemented in a user terminal, a base station, and generally in a wireless communication network or system comprising both the user terminal and the base station. The exemplary embodiments may also be implemented in an application specific integrated circuit (ASIC), or a digital signal processor. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. A processor in association with software may be used to implement a radio frequency transceiver for use in the user terminal, the base station or any host computer. The user terminal may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

Although the features and elements of the present exemplary embodiments are described in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

What is claimed is:

1. A method for transmitting cell individual offset information associated with an offset of a cell to a user terminal which is configured to communicate with the cell in addition to a serving cell, comprising:
    generating the cell individual offset information independent of a cell synchronization of the user terminal with the cell or independent of a cell frequency offset used in a synchronizing process between the cell and the user terminal;
    mapping the cell individual offset information on at least one channel that is different from a broadcast channel, wherein the at least one channel is at least one of a reference symbols channel, a primary synchronization channel, a secondary synchronization channel, and a combination thereof;
    transmitting the mapped cell individual offset information to the user terminal before the user terminal has read system information from a broadcast channel of the cell; and
    preventing a serving base station, which is serving the user terminal, from transmitting a list of neighboring cells of the user terminal;
    wherein the cell individual offset information comprises a cell offset indication bit that indicates whether or not there is a cell individual offset in the cell;
    wherein if the cell offset indication bit indicates that there is a cell individual offset in the cell, the cell offset indication bit instructs the user terminal to read system information from the broadcast channel of the cell to obtain the cell individual offset; and
    wherein if the cell offset indication bit indicates that there is no cell individual offset in the cell, the cell offset indication bit instructs the user terminal to not read system information from the broadcast channel of the cell.

2. The method of claim 1, wherein if the cell offset indication bit indicates that there is no cell individual offset in the cell, the cell offset indication bit configures the user terminal to not apply a cell individual offset when reporting events or measurements of the cell to the serving cell.

3. The method of claim 1:
    wherein if the cell offset indication bit indicates that there is a cell individual offset in the cell, the cell offset indication bit configures the user terminal to apply the cell individual offset when reporting events or measurements of the cell to the serving cell.

4. The method of claim 1, wherein the mapping comprises:
    mapping the cell individual offset information on every occurrence of a frame of the at least one channel.

5. The method of claim 1, wherein the mapping comprises:
    mapping the cell individual offset information on every "N" occurrence of a frame of the at least one channel, wherein N is an integer number equal to or larger than 2.

6. A method for determining whether to apply a cell individual offset at a user terminal, which is configured to be connected to a cell in a communication network in addition to a serving cell, to at least one of measurement reports and events associated with the cell, comprising:
    receiving at least one channel, different from a broadcast channel, in which the cell individual offset information has been mapped;
    extracting the cell individual offset information from the at least one channel before the user terminal has read system information from a broadcast channel of the cell; and
    determining from the cell individual offset information whether the offset is present in the cell;
    wherein the at least one channel is at least one of a reference symbols channel, a primary synchronization channel, a secondary synchronization channel, and a combination thereof;
    wherein the receiving, extracting, and determining are performed without receiving a list of neighboring cells from a serving base station that serves the user terminal; and
    wherein the cell individual offset information comprises a cell offset indication bit, the method further comprising:
        if the cell offset indication bit indicates that there is a cell individual offset in the cell, reading system information from the broadcast channel of the cell to obtain the cell individual offset; and
        if the cell offset indication bit indicates that there is not a cell individual offset in the cell, not reading system information from the broadcast channel of the cell.

7. The method of claim 6, further comprising:
    if the cell offset indication bit indicates that there is no cell individual offset in the cell, determining to not apply a cell individual offset when reporting events or measurements of the cell to the serving cell.

8. The method of claim 6, further comprising:
    applying the cell individual offset when reporting events or measurements of the cell to the serving cell.

9. The method of claim 6, wherein the extracting comprises:
    extracting the cell individual offset information on every occurrence of a frame in the at least one channel.

10. The method of claim 6, wherein the extracting comprises:
    extracting the cell individual offset information on every "N" occurrence of a frame in the at least one channel, wherein N is an integer number equal to or larger than 2.

11. A base station in a cell configured to send cell individual offset information to a user terminal, wherein the base station and the user terminal are connected to a communication network, and the user terminal selectively applies a cell individual offset to at least one of measurement reports and events associated with a cell based on the cell individual offset information, comprising:
    a processor configured to:
        generate the cell individual offset information independent of a cell synchronization of the user terminal with the cell or independent of a cell frequency offset used in a synchronizing process between the cell and the user terminal;
        map the cell individual offset information on at least one channel that is different from a broadcast channel, wherein the at least one channel is at least one of a reference symbols channel, a primary synchronization channel, a secondary synchronization channel, and a combination thereof; and
        prevent a serving base station, which is serving the user terminal, from transmitting a list of neighboring cells of the user terminal; and
    an antenna connected to the processor and configured to transmit the mapped cell individual offset information received from the processor to the user terminal before the user terminal has read system information from a broadcast channel of the cell;

wherein the cell individual offset information comprises a cell offset indication bit that indicates whether or not there is a cell individual offset in the cell;

wherein if the cell offset indication bit indicates that there is a cell individual offset in the cell, the cell offset indication bit instructs the user terminal to read system information from the broadcast channel of the cell to obtain the cell individual offset; and wherein if the cell offset indication bit indicates that there is no cell individual offset in the cell, the cell offset indication bit instructs the user terminal to not read system information from the broadcast channel of the cell.

12. The base station of claim 11, wherein if the cell offset indication bit indicates that there is no cell individual offset in the cell, the cell offset indication bit configures the user terminal to not apply a cell individual offset when reporting events or measurements of the cell to a serving cell.

13. The base station of claim 11, wherein the processor is further configured to map the cell individual offset information on every occurrence of a frame of the at least one channel.

14. A user terminal connected in a communication network to a base station in a cell, the user terminal being configured to determine whether to apply a cell individual offset to at least one of measurement reports and events associated with a cell, comprising:

an antenna configured to receive at least one channel in which cell individual offset information has been mapped, the at least one channel being different from a broadcast channel; and a processor connected to the antenna and configured to perform the following without receiving a list of neighboring cells from a serving base station that serves the user terminal:

extract the cell individual offset information from the received at least one channel before the user terminal has read system information from the broadcast channel of the cell;

determine that the at least one channel is one of a reference symbols channel, a primary synchronization channel, a secondary synchronization channel, and a combination thereof; and determine from the cell individual offset information whether a cell individual offset is present in the cell;

wherein the cell individual offset information comprises a cell offset indication bit; and wherein the processor is further configured to:

if the cell offset indication bit indicates that there is a cell individual offset in the cell, read system information from a broadcast channel of the cell to obtain the cell individual offset; and if the cell offset indication bit indicates that there is not a cell individual offset in the cell, not read system information from the broadcast channel of the cell.

15. The user terminal of claim 14, wherein the processor is further configured to, if the cell offset indication bit indicates that there is not a cell individual offset in the cell, not apply a cell individual offset when reporting events or measurements of the cell to a serving cell.

16. The user terminal of claim 14, wherein the processor is further configured to extract the cell individual offset information on every occurrence of a frame in the at least one channel.

17. The user terminal of claim 14, wherein the processor is further configured to extract the cell individual offset information on every "N" occurrence of a frame in the at least one channel, wherein N is an integer number equal to or larger than 2.

18. A non-transitory computer readable medium that stores instructions, which when executed on a processor in a base station in a cell in a communication network, causes the base station to send cell individual offset information to a user terminal that selectively applies a cell individual offset to at least one of measurement reports and events associated with a cell based on the cell individual offset information, the instructions comprising instructions for:

generating the cell individual offset information independent of a cell synchronization of the user terminal with the cell or independent of a cell frequency offset used in a synchronizing process between the cell and the user terminal;

mapping the cell individual offset information on at least one channel that is different from a broadcast channel, wherein the at least one channel is at least one of a reference symbols channel, a primary synchronization channel, a secondary synchronization channel, and a combination thereof;

transmitting the mapped cell individual offset information to the user terminal before the user terminal has read system information from a broadcast channel of the cell; and preventing a serving base station, which is serving the user terminal, from transmitting a list of neighboring cells of the user terminal;

wherein the cell individual offset information comprises a cell offset indication bit that indicates whether or not there is a cell individual offset in the cell;

wherein if the cell offset indication bit indicates that there is a cell individual offset in the cell, the cell offset indication bit instructs the user terminal to read system information from the broadcast channel of the cell to obtain the cell individual offset; and wherein if the cell offset indication bit indicates that there is no cell individual offset in the cell, the cell offset indication bit instructs the user terminal to not read system information from the broadcast channel of the cell.

19. A non-transitory computer readable medium that stores instructions, which when executed on a processor in a user terminal, which is connected to a cell in a communication network, causes the user terminal to determine whether to apply a cell individual offset to at least one of measurement reports and events associated with a cell, the instructions comprising instructions for:

receiving at least one channel, different from a broadcast channel, in which cell individual offset information has been mapped;

extracting the cell individual offset information from the at least one channel before the user terminal has read system information from a broadcast channel of the cell; and determining from the cell individual offset information whether a cell individual offset is present in the cell;

wherein the at least one channel is at least one of a reference symbols channel, a primary synchronization channel, a secondary synchronization channel, and a combination thereof;

wherein the receiving, extracting, and determining are performed without receiving a list of neighboring cells from a serving base station that serves the user terminal; and wherein the cell individual offset information comprises a cell offset indication bit, the instructions further comprising instructions for:
 if the cell offset indication bit indicates that there is an individual offset in the cell, reading system information from a broadcast channel of the cell to obtain the cell individual offset; and
 if the cell offset indication bit indicates that there is not an individual offset in the cell, not reading system information from the broadcast channel of the cell.

20. A base station in a cell configured to send cell individual offset information to a user terminal, wherein the base station and the user terminal are connected to a communication network, and the user terminal selectively applies a cell individual offset to at least one of measurement reports and events associated with a cell, comprising:
 a processor configured to:
  generate the cell individual offset information independent of a cell synchronization of the user terminal with the cell or independent of a cell frequency offset used in a synchronizing process between the cell and the user terminal;
  map the cell individual offset information on at least one channel that is different from a broadcast channel, wherein the at least one channel is at least one of a reference symbols channel, a primary synchronization channel, a secondary synchronization channel, and a combination thereof; and
  prevent a serving base station, which is serving the user terminal, from transmitting a list of neighboring cells of the user terminal; and
 a transmitter configured for transmitting the mapped cell individual offset information to the user terminal before the user terminal has read system information from a broadcast channel of the cell;
 wherein the cell individual offset information comprises a cell offset indication bit that indicates whether or not there is a cell individual offset in the cell;
 wherein if the cell offset indication bit indicates that there is a cell individual offset in the cell, the cell offset indication bit instructs the user terminal to read system information from the broadcast channel of the cell to obtain the cell individual offset; and
 wherein if the cell offset indication bit indicates that there is no cell individual offset in the cell, the cell offset indication bit instructs the user terminal to not read system information from the broadcast channel of the cell.

21. A user terminal connected in a communication network to a base station in a cell, the user terminal being configured to determine whether to apply a cell individual offset to at least one of measurement reports and events associated with a cell, said user terminal comprising:
 a receiver configured to receive at least one channel in which the cell individual offset information has been mapped, the at least one channel being different from a broadcast channel, wherein the at least one channel is at least one of a reference symbols channel, a primary synchronization channel, a secondary synchronization channel, and a combination thereof; and
 a processor configured to perform the following without the receiver receiving a list of neighboring cells from a serving base station that serves the user terminal:
  extract the cell individual offset information from the received at least one channel before the user terminal has read system information from a broadcast channel of the cell, and determine from the cell individual offset information whether the offset is present in the cell, wherein the cell individual offset information comprises a cell offset indication bit;
 if the cell offset indication bit indicates that there is a cell individual offset in the cell, read system information from the broadcast channel of the cell to obtain the cell individual offset; and
 if the cell offset indication bit indicates that there is not a cell individual offset in the cell, not read system information from the broadcast channel of the cell.

* * * * *